3,067,523
METHOD OF CURING PERISHABLE BULB ONIONS IN AN ENCLOSURE
Ferdinand Austin Teigen, Minneapolis, Minn., assignor to Allium, Inc., Minneapolis, Minn., a corporation of Minnesota
Filed Oct. 13, 1953, Ser. No. 766,945
10 Claims. (Cl. 34—27)

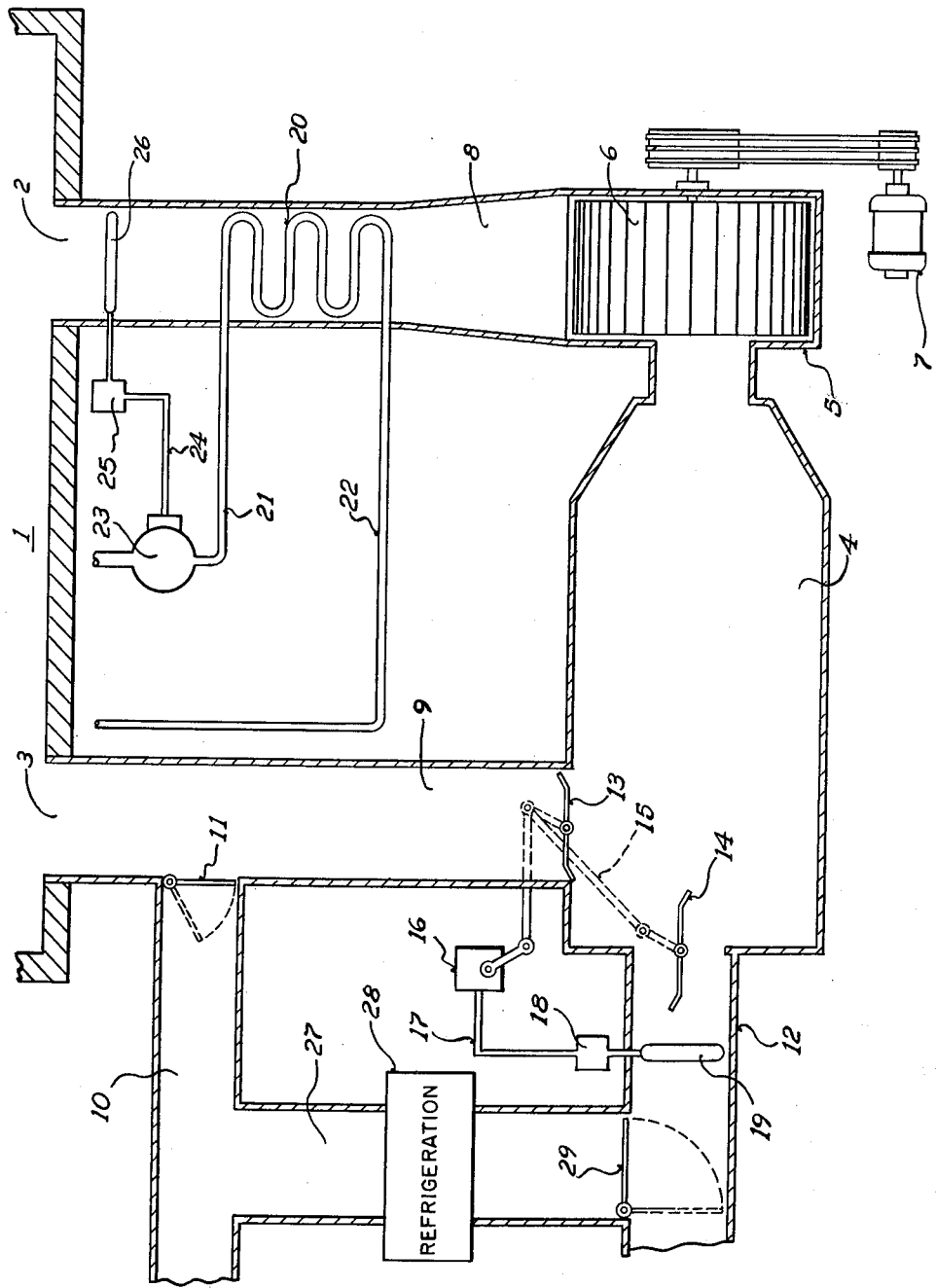

This invention relates to improvements in a method of curing perishable bulb onions in an enclosure.

After perishable bulb onions have been harvested, they must undergo a curing process wherein wounds are healed and the skins of the onions are properly treated to produce a marketable product.

Bulb onions are living entities with definite biological and metabolical properties and processes. Their outer skins are hygroscopic and are, therefore, capable of absorbing moisture and forming a condition in which microorganisms can multiply. Also, when the tops are removed from the bulbs, or the bulbs are injured in handling, the wounds thus created expose tissues to allow the escape of fluids, and form ports of entry for bacteria and spores. These adverse conditions are overcome by subjecting the bulbs to a curing process. The term "curing" as is used herein relates to a process wherein the harvested bulbs are subjected to treatment within an enclosure by forcing into intimate contact with the surfaces of the bulbs, air of specified characteristics to attain a desirable curing temperature and removal of superfluous moisture, as well as the healing of wounds and the creation of a proper condition of the onion skins.

When the state of hygroscopicity of the outer skins of the onion bulbs reach an optimum condition, said skins develop a characteristic whereby when a body of onion bulbs is moved, a distinct sound or rattle is emitted. A body of onions will rattle when the state of hygroscopicity of the bulbs is relatively high, and this is a condition which is recognized in the trade as indicative of a good quality of the onions. If a body of onions fails to rattle, said condition indicates that the state of hygroscopicity of the skins is low, and this is a condition in which microorganisms can develop and cause rotting of the product.

This application is related to my co-pending application Ser. No. 341,038, now Patent No. 2,855,839, dated October 14, 1958, and is also related to my co-pending applications Ser. Nos. 766,943, and 766,944, filed concurrently herewith.

In conducting the curing process, the onions after harvest are topped and placed in a substantially airtight enclosure through which air of desirable characteristics is circulated so as to be in intimate contact with the bodies of the onions. During the primary phase of the curing process, the onions must be brought to a proper curing temperature, which generally is within the range of substantially 50° F.–68° F. This may require either heating or cooling the onions, and is accomplished by control of the temperature of the air which is circulated through the onions while maintaining its relative humidity in the range of substantially 30%–70%. When, or after the onions are brought into the proper curing temperature range, conditioned air of the same temperature range is forced through the onions until a desirable tone of rattle is attained, which is sharp and clear. However, since the onion bulbs constantly evolve moisture as a result of respiration, it is necessary to maintain the onions at the desired curing condition, and therefore, the process must be intermittently conducted to maintain a desired temperature of the onions, and also remove moisture from their skins. In this manner, the onions are treated until by expert opinion, based on appearance, and the tone of the rattle of the onions is satisfactory. Thereafter, the product is either shipped to market, or retained in the enclosure, and in the event that the latter condition is necessary, the temperature of the onions is reduced to substantially 32° F. while maintaining a high state of hygroscopicity to retain the desired tone of rattle and prevent the occurrence of rotting or disease.

In each of my applications, there is disclosed a method of compounding air of desirable temperature and relative humidity from return air within the enclosure and air from a source of cooler, drier air, which may be either ambient air or air which has been conditioned to have a predetermined dew point and dry bulb temperature substantially lower than the air in the enclosure. The air thus compounded is heated in one manner or another and forced through the body of onions to attain or maintain a desired condition of the onion bulbs. In this application is disclosed a modification embodying the control of the compounding of a mixture of return air and cooler drier air by volumetrically proportioning air from the two sources in accordance with changes of the temperature of the cooler, drier air, prior to mixture, and the control of the heating thereof subsequent to heating, and immediately prior to the entry of such conditioned air into the enclosure in which the onions are stored.

An object of the invention is the provision of a method of curing onions in an enclosure by the circulation of air through the enclosure and in contact with the onions to establish and maintain an optimum curing condition thereof, both as to temperature and relative humidity, and also progressively establish and constantly maintain a state of hygroscopicity in the outer skins of the onions, wherein the tone of the rattle of the onions when moved is satisfactory.

Another object is the provision of a method of compounding air composed of two components, one of which constitutes air from the enclosure in which onions are undergoing cure, and the other constituting a source of cooler, drier air, by controlling the ratio one to the other in accordance with a formula based on the thermodynamic properties of one component in relation to the thermodynamic properties of the other component, and the thermodynamic properties of the mixture in relation to the temperature and condition of the onions.

Other and further objects of the invention may be apparent upon consideration of the following description and claims, and in the appended drawing, which constitutes a schematic representation of a form of apparatus by which the process may be conducted.

Referring now to the single FIGURE of the drawing, which is schematic and intended for illustrative purposes, the invention will be described in detail.

Reference numeral 1 designates an enclosure in which onions to be cured may be confined. The enclosure is only fragmentarily disclosed, and would be constructed in accordance with climatic conditions prevailing in the area where the onions are located, but it should be substantially airtight. While enclosure 1 is provided with a suitable door, not shown, for admitting and removing the onions, insofar as this disclosure is concerned, it is provided with an air inlet 2 that would normally extend beneath a false floor, not shown, for suitably distributing air through the mass of onions stored within the enclosure. Enclosure 1 is also provided with an air outlet opening 3 that would preferably extend from adjacent the upper limits of the enclosure.

Situated exterior to enclosure 1 is a form of apparatus for composing and conditioning air that is used for curing the onions confined in the enclosure. A mixing chamber or casing 4 is suitably connected to a casing 5 that contains a blower 6 driven by a motor 7 through suitable connections. Blower 6 is provided to draw air from casing 4 and passages connected thereto, and to discharge such air into a supply duct 8 that extends into the inlet opening 2 of enclosure 1, in sufficient volume to appreciably contact all of the onions confined in enclosure 1. A return duct 9 extends from the outlet opening 3 of enclosure 1, and said duct is suitably connected to casing 4 at a part thereof spaced substantially from the opening to fan casing 5. Extending from the return duct 9 is an exhaust air duct 10, and at the junction of these ducts is a pressure actuated damper 11 that permits discharge of air from duct 9 into duct 10. The duct 10 extends to outside atmosphere and serves to relieve superfluous air from the system to the atmosphere.

At the inner terminal ends of ducts 9 and 12 are dampers 13 and 14, that are interconnected by a linkage 15 to a motor 16. Motor 16 is joined by a cable 17 to a thermostat 18, which is provided with a temperature sensitive portion 19 disposed in the duct 12.

Thermostat 18 and damper motor 16 in combination are of a design to provide a full orbit of movement to the dampers upon a change of temperature within a predetermined range. That is, for a change of each degree of temperature from and towards a selected temperature, the dampers will assume a fixed proportional setting in respect to the relative volumes of air admitted from ducts 9 and 12 into casing 4. Damper motors which accomplish this result generally involve a heart-shaped cam, and such damper motors and thermostats are available on the open market. For illustrative purposes here, it is assumed that thermostat 18 and damper motor 16 have a differential range of 24° from and towards a fixed setting, and within said range, the proportions of cool air and return air may be alternately varied in a wide range, bearing in mind that when the fan is operating at all times some air is always being admitted into chamber 4 from both ducts.

Disposed within duct 8 is a source of heat that is disclosed in the form of a serpentine coil 20, whose inlet end is connected to a conduit 21, and whose outlet is connected to a conduit 22. Disposed within the conduit 21 is a control valve 23 of a modulating type which is joined by a cable 24 to a thermostat 25 that has a temperature sensitive portion 26 disposed in duct 8 to be responsive to the temperature of air flowing in duct 8 to the enclosure 1. The conduits 21 and 22 are connected to a steam boiler or a source of hot water of substantially constant temperature, or any other medium may be used as the source of heat subject to control with a device similar in function to the valve 23.

It has been stated heretofore that it is an essential characteristic of the air passing through duct 12 to be of a dew point and dry bulb temperature that is substantially lower than the concurrent dew point and dry bulb temperature of the air in enclosure 1. In the event that ambient air would not always meet the requirements specified, a duct 27 extends between ducts 10 and 12, and contains a suitable form of air conditioning apparatus 28, whose capacity can be controlled to reduce the temperature of air within duct 27 to a desired dry bulb and dew point temperature suitable for the process. A control damper 29 is disposed between the discharge side of duct 27 and duct 12 for controlling the source of air entering duct 12. It should be understood that when the mechanism 28 is operative and damper 29 is rotated to the dotted line position, the air entering duct 12 will be either fresh outside air or air discharged from duct 9 through damper 11, or a mixture of air from both of said sources.

The operation of the process will now be explained. Assuming as a typical example, that the temperature of the onions in enclosure 1 is 32° F., and the temperature of ambient air is also 32° F. To perform the primary stage of curing the onions, it is necessary that their temperature be raised into the range of substantially 50°–68° F. by circulating in contact with the onions air whose temperature is not more than substantially 15° F. different than the onion temperature, and whose relative humidity is in the range of substantially 30%–70%. Since the onion temperature in this example is quite low, it is desirable that said temperature be raised gradually, and therefore, the process would ordinarily occur in several stages. Since the temperature of the conditioned air should not exceed the temperature of the onions by more than 15° F., it will be assumed that from the initial stages of the process, the air supplied to enclosure 1 shall have a temperature of substantially 47° F. Under the conditions stated, ambient air having a temperature of 32° F. may be used as the source of cooler, drier air. Ambient air can be used in this process provided its temperature is at least 10° lower than the fixed temperature of the supply air, and at the present stage, said fixed temperature of the supply air is regarded to be 47° F. Thermostat 18 must be set at a temperature at least 10° below said fixed temperature, and it may be set as much as 15° below said fixed temperature of the supply air, but in this example, by preference, it is fixed at 12° below the fixed temperature of the supply air, or at a temperature of 35° F. Thermostat 25 is set at a temperature of 47° F. With the parts in the position shown, and assuming blower 6 to be in operation, ambient air will be drawn through duct 12 into the mixing chamber 4, and as such air is drawn over the sensitive element 19, the thermostat 18 is effected to actuate motor 16 to set the dampers 13 and 14 in such a position that the proportions of fresh and return air will be of such a ratio that when delivered to duct 8 and heated by heater 20 to 47° F. will have a relative humidity in the range of substantially 30%–70%, because if the temperature of the supply air is different than 47° F., the thermostat 25 will so adjust the position of the control device 23 as to control the flow of heating medium, such as to adjust the temperature to 47° F. The air thus compounded and heated is forced into contact with the onions and will act to raise the temperature of the onions as well as remove superficial moisture from the surfaces thereof, whence such air is exhausted through the opening 3 into duct 9 and a portion thereof will be vented through the gravity operated damper 11 and duct 10 to atmosphere.

The basis on which the proportion of fresh air and return air is computed is as follows: Since thermostat 18 and its motor 16 have a range of movement of 24° from the setting of 35°, the 3° differential between ambient and the setting of thermostat 18 would cause the mechanism to establish a predetermined relationship between dampers 13 and 14 which would cause the ratio of fresh air to return air expressed in terms of pounds of air, to be equal to the difference between the B.t.u. content per pound of the mixture after heating, and the B.t.u. content of the fresh air, when said fresh air is of the fixed temperature, heretofore expressed to be 35° F., to the difference between the B.t.u. content per pound of said fresh air at its existing temperature of 32° F., and its fixed temperature of 35° F. This may be expressed by the formula:

$$\frac{C}{R} = \frac{A-B}{B-D}$$

where A represents the fixed temperature of the supply air, which is the degree setting of thermostat 25, or in this example is 47° F.; B represents the fixed temperature of the fresh air which is the degree setting of thermostat 18, or in this example is 35° F.; and D is the existing temperature of the ambient air, which in this example is 32° F.

To illustrate this formula mathematically, the B.t.u. content of 47° F. air is 11.28 B.t.u.'s per pound, 35° F. air contains 8.39 B.t.u.'s per pound of air, and 32° F.

air contains 7.67 B.t.u.'s per pound of air. Accordingly, the formula may be expressed as:

$$\frac{\text{Lbs. cool air}}{\text{Lbs. return air}} = \frac{11.28 - 8.39}{8.39 - 7.67} = \frac{2.89}{.72} = \frac{4 \text{ lbs.}}{1 \text{ lb.}}$$

Thus under the stated circumstances, the damper system provides four pounds of cool air from duct 12 to each pound of return air from duct 9.

Assuming the ambient air at 32° F. were saturated, it would contain 26.4 grains of moisture per pound of air. Assuming the return air from chamber 1 to have been cooled by the onions to a temperature of substantially 39.5°, and saturated, such air would contain 36.3 grains of moisture per pound of air. Therefore, the mixture of air in chamber 4 would conceivably contain a maximum of 28.4 grains of moisture per pound of air. At 47° F., air can contain 47.66 grains of moisture per pound of air. Therefore 1% of relative humidity is .476 grains of moisture per pound of air, which when divided into the figure 28.4 gives a relative humidity of air delivered from duct 8 after being heated, to be substantially 59% relative humidity.

In the foregoing example, it has been assumed that ambient air was saturated, and likewise, the return air was saturated, and since it is possible that the relative humidity of ambient air could be as low as 50%, it will be evident that the heated supply air will always have a relative humidity of substantially 30%, and less than substantially 70%.

Returning now to the consideration of the treatment of the onions as their temperature increases, the settings of thermostat 25 and 18 are correspondingly increased, while maintaining the differential of 12° F. between the settings of these thermostats until the onions are substantially 60° F., wherein the process is continued until a satisfactory tone of rattle of the onions is established, whereupon the process is shut down, but may be intermittently operated whenever the tone of rattle of the onions becomes unsatisfactory as a result of the absorption of moisture, which has been evolved and surrendered biologically by the onions through the respiratory process.

In the foregoing discussion, it has been assumed that ambient air was at least 10° cooler than the fixed temperature of the supply air. In the event that this condition might not prevail, then it would be necessary to use refrigeration apparatus 28, in which case, the differential in setting between thermostat 18 and thermostat 25 might be 10°-30° F., but preferably 20° F., and the unit 28 would then be adjusted to produce air of a temperature equal to or lower than the setting of thermostat 18, and the operation would be as heretofore described.

The primary curing stage is conducted until by expert opinion, based on the appearance of the onions, a cure has been obtained, whence for storage purposes, it is deemed advisable to reduce the temperature of the onions to substantially 32° F. to thereby retard the respiratory process. To cool the onions down to 32° F., the thermostat 25 is set at a temperature lower than the onion temperature, but never more than substantially 15° F. different from the onion temperature, and not lower than 32° F., and in this instance, the temperature of the onions being 60° F., the thermostat is set at 45° F. The thermostat 18 is adjusted at substantially 10° lower than the setting of thermostat 25, and with the temperature of ambient air being at least 10° below the setting of thermostat 25, the process is conducted as described heretofore, except that during this stage, the onions are cooled, rather than heated. When the onions reach a temperature of substantially 32° F., thermostat 25 is set at a temperature of substantially 34° F., and thermostat 18 is set at a temperature of substantially 24° F., and the process intermittently conducted as long as the onions are retained in the enclosure 1.

In the event that ambient air is not sufficiently cool to produce the desired refrigeration, then unit 28 would be utilized, bringing the air temperature downwardly into the terminal curing temperature range.

The advantage of this invention is the provision of a method of curing onions in an enclosure by controlling the dryness and temperature of the onions so as to attain and maintain the highest possible market value thereof.

I claim:

1. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder fresh air from outside having a dew point substantially lower than that of said warmer air which air by specific reference is designated and hereinafter known and referred to as said colder air to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air; forming said mixed air into an entitative stream flowing thru said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air to be of a degree at least sufficiently high to cause said heated air when forced into initial contact with said onions to have a vapor pressure lower than that of said onions and to be of a degree at least sufficiently different from the concurrent temperature of said onions to cause said heated air to have the capacity to affect the concurrent temperature of said onions when outside of 50° F.–68° F. during early and substantially 32° F. during later stages of curing in a concurrently desired manner and measure by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing and discharging superfluous air from said enclosure.

2. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder fresh air from outside having a dew point substantially lower than that of said warmer air which air by specific reference is designated and hereinafter known and referred to as said colder air to cause the resultant mixed air, which air by specific reference is designated as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air; forming said mixed air into an entitative stream flowing thru said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air; adjusting and regulating the temperature of the resultant heated mixed air, which air by specific reference is designated and hereinafter known and referred to as said heated air, to be of a degree at least sufficiently high to cause said heated air when forced thru said onions to absorb superfluous moisture carried by said onions and (to be of a degree) at least sufficiently different from the concurrent temperature of said onions to cause said heated air when forced thru said onions to adjust the temperature of said onions when outside 50° F.–68° F. during early and substantially 32° F. during later stages of curing toward degree concurrently desired by varying the heating of said mixed air in accordance with changes in the temperature of said heated air after composition and before contacting said onions; forcing said heated air into contact with and thru said onions during confinment in said enclosure except when said onions have neither superfluous moisture nor a temperature outside of 50° F–68° F. during early and substantially 32° F. during later stages of curing and discharging superfluous air from said enclosure.

3. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder fresh air from outside having a dew point substantially lower than that of said warmer air which air by speciic reference is designated and hereinafter known and referred to as said colder air to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air forming said mixed air into an entitative stream flowing thru said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air to be of a degree at least sufficiently high to cause said heated air to have the capacity when forced into initial contact with said onions to dissipate superfluous moisture carried by said onions and to be of a degree at least sufficiently different from the concurrent temperature of said onions when outside of 50° F.–68° F. during early and substantially 32° F. during later stages of curing to have the capacity to adjust the temperature of said onions toward a concurrently desired degree by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing and discharging superfluous air from said enclosure.

4. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air processed and conditioned to have and having a dew point substantially lower than that of said warmer air which air by specific reference is designated and hereinafter known and referred to as said colder air to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air; forming said mixed air into an entitative stream flowing thru said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air to be of a degree at least sufficiently high to cause said heated air to have a vapor pressure lower than that of said onions and to be of a degree at least sufficiently different from the concurrent temperature of said onions to cause said heated air to have the capacity to affect the concurrent temperature of said onions when outside of 50° F.–68° F. during early and substantially 32° F. during later stages of curing in a concurrently desired manner and measure by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing and discharging superfluous air from said enclosure.

5. A method of curing fresh perishable onions including the steps of: confining said onions in a substantially air tight insulated enclosure, providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air processed and conditioned to have and having a dew point substantially lower than that of said warmer air which air by specific reference is designated and hereinafter known and referred to as said colder air to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air; forming said mixed air into an entitative stream flowing thru said onions; heating said mixed air to have a temperature of a concurrently desired degree with a range of 31° F.–78° F.; adjusting and regulating the temperature of the resultant heated mixed air, which air by specific reference is designated and hereinafter known and referred to as said heated air to be of a degree at least sufficiently high to cause said heated air to have the capacity when forced into initial contact with said onions to dissipate superfluous moisture when carried by said onions and to be of a degree at least sufficiently different from the concurrent temperature of said onions when outside of 50° F.–68° F. during early and substantially 32° F. during later stages of curing to have the capacity to adjust the temperature of said onions toward a concurrently desired degree by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing and discharging superfluous air from said enclosure.

6. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air processed and conditioned to have and having a dew point substantially lower than that of said warmer air which air by specific reference is designated and hereinafter known and referred to as said colder air to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air; forming said mixed air into an entitative stream flowing thru said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air to be of a degree at least sufficiently high to cause said heated air when forced thru said onions to absorb superfluous moisture when carried by said onions and (to be of a degree) at least sufficiently different from the concurrent temperature of said onions to cause said heated air when forced thru said onions to adjust the temperature of said onions when outside 50° F.–68° F. during early and substantially 32° F. during later stages of curing toward degree concurrently desired by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing and discharging superfluous air from said enclosure.

7. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air having a dew point substantially lower than that of said warmer air which air by specific reference is designated and hereinafter known and referred to as said colder air to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air; forming said mixed air into an entitative stream flowing thru said onions; heating said mixed air to have a temperature of a concurrently desired degree within a range of 31° F.–68° F.; adjusting and regulating the temperature of the resultant heated mixed air, which air by specific reference is designated and hereinafter known and referred to as said heated air to be of a degree at least sufficiently high to cause said heated air when forced thru said onions to absorb superfluous moisture carried by said onions and (to be of a degree) at least sufficiently different from the concurrent temperature of said onions to cause said heated air when forced thru said onions to adjust the temperature of said onions when outside 50° F.–68° F. during early and substantially 32° F. during later stages of curing toward degree concurrently desired by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing and discharging superfluous air from said enclosure.

8. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air having a dew point substantially lower than that of said warmer air which air by specific reference is designated and hereinafter known and referred to as said colder air to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air; forming said mixed air into an entitative stream flowing thru said onions; heating said mixed air to have a temperature of a concurrently desired degree within a range of 31° F.–68° F.; adjusting and regulating the temperature of the resultant heated mixed air, which air by specific reference is designated and hereinafter known and referred to as said heated air to be of a degree at least sufficiently high to cause said heated air to have a vapor pressure lower than that of said onions and to be of a degree at least sufficiently different from the concurrent temperature of said onions to cause said heated air to have the capacity to affect the concurrent temperature of said onions when outside of 50° F.–68° F. during early and substantially 32° F. during later stages of curing in a concurrently desired manner and measure by varying the heating of said mixed air in accordance with changes in the temperature of said heated air after composition and before contacting said onions forcing said heated air into contact with and thru said onions; during confinement in said enclosure except when said onions have neither superfluous moisture nor a temperature outside of 50° F.–68° F. during early and substantially 32° F. during later stages of during and discharging superfluous air from said enclosure.

9. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air having a dew point substantially lower than that of said warmer air which air by specific reference is designated and hereinafter known and referred to as said colder air to cause the resultant mixed air, which air by specific reference is designated and hereinafter known and referred to as said mixed air, to have a dew point lower than that of said warmer air; adjusting and regulating the temperature of said mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air; forming said mixed air into an entitative stream flowing thru said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air to be of a degree at least sufficiently high to cause said heated air to have the capacity when forced into initial contact with said onions to dissipate superfluous moisture when carried by said onions and to be of a degree at least sufficiently different from the concurrent temperature of said onions when outside of 50° F.–68° F. during early and substantially 32° F. during later stages of curing to have the capacity to adjust the temperature of said onions toward a concurrently desired degree by varying the heating of said mixed air in accordance with changes in the temperature of said heated air after composition and before contacting said onions; forcing said heated air into contact with and thru said onions during confinement in said enclosure except when said onions have neither superfluous moisture nor a temperature outside of 50° F.–68° F. during early and substantially 32° F. during later stages of curing and discharging superfluous air from said enclosure.

10. A method of curing fresh perishable onions including the steps of: confining said onions in a substantially air tight insulated enclosure; providing a specific for the treatment of said onions during confinement in said enclosure to enhance curing by withdrawing and mixing air from said enclosure, which air by specific reference is designated and hereinafter known and referred to as said warmer air, with at least a sufficient volume of colder air having a dew point substantially lower than that of said warmer air which air by specific reference is designated and hereinafter known and referred to as said colder air to cause the resultant mixed air, which by specific reference is designated said mixed air, to have a dew point lower than that of said warmer air; adjusting and regulating the temperature of the resultant mixed air to be of a degree at least sufficiently low to cause said mixed air to have a dew point lower than that of said warmer air by varying the volume of said colder air mixed with said warmer air in composing said mixed air in accordance with changes in the temperature of said colder air before being mixed with said warmer air to compose said mixed air; forming said mixed air into an entitative stream flowing thru said onions; heating said mixed air to have a temperature of a concurrently desired degree within a range of 31° F.–78° F.; adjusting and regulating the temperature of the resultant heated mixed air, which air by specific reference is designated and hereinafter known and referred to as said heated air to be of a degree at least sufficiently high to cause said heated air when forced into initial contact with said onions to have a relative humidity substantially lower than that of said warmer air and to be of a degree different from that of said onions in the direction concurrently desired by varying the heating of said mixed air in accordance with changes in the temperature of said heated air after composition and before contacting said onions forcing said heated air into contact with and thru said onions during confinement in said enclosure except when said onions have neither superfluous moisture nor a temperature outside of 50° F.–68° F. during early and substantially 32° F. during later stages of curing and discharging superfluous air from said enclosure.

References Cited in the file of this patent

UNITED STATES PATENTS

| | | |
|---|---|---|
| 2,048,137 | Palmer | July 21, 1936 |
| 2,274,153 | Miller | Feb. 24, 1942 |
| 2,286,316 | Snook | June 16, 1942 |
| 2,855,839 | Teigen | Oct. 14, 1958 |